July 7, 1925.  
W. SHURTLEFF  
1,544,690  
AIR FILTER FOR HEATING AND VENTILATING UNITS  
Filed Jan. 19, 1923
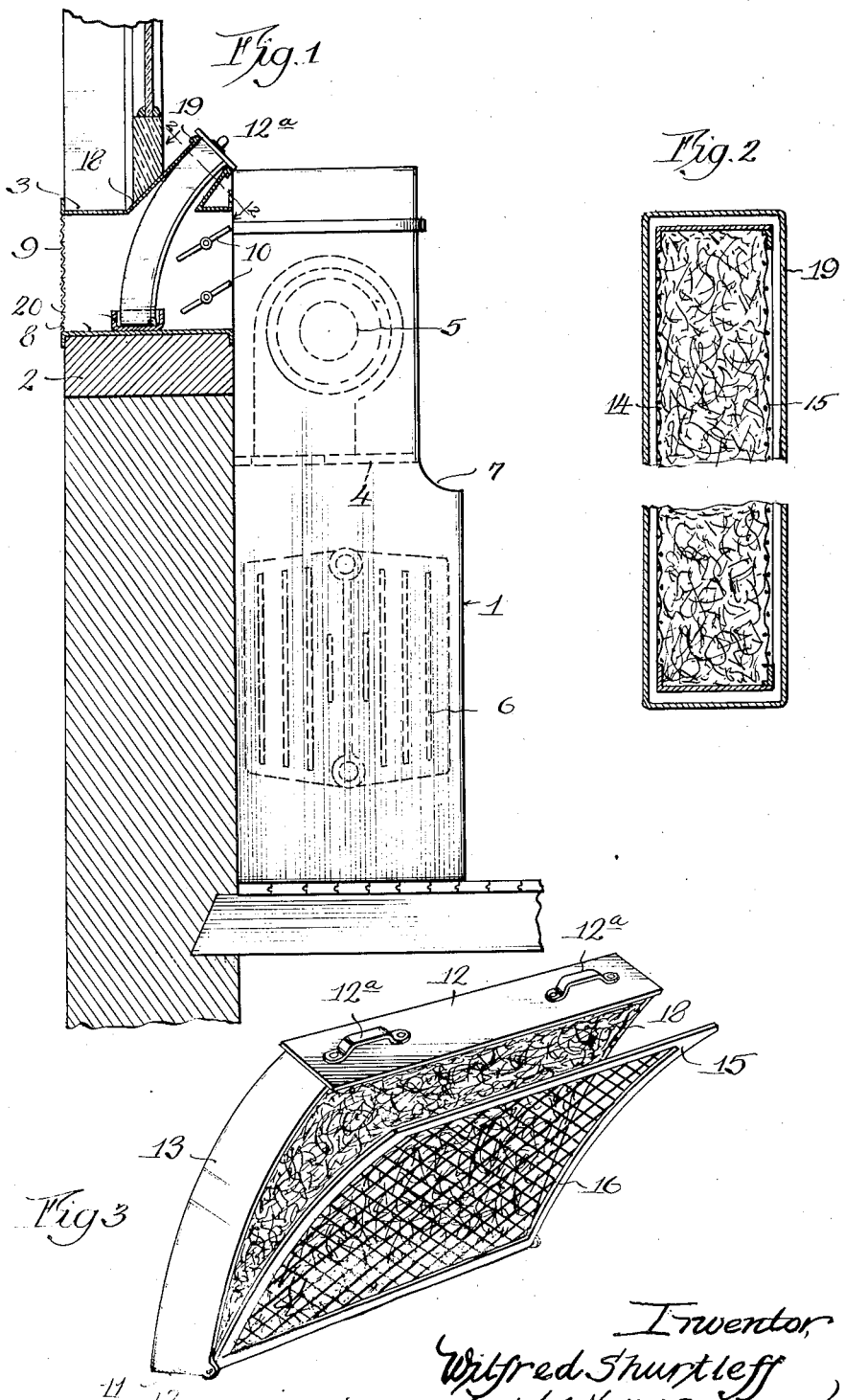
Inventor  
Wilfred Shurtleff Patented July 7, 1925.

1,544,690

UNITED STATES PATENT OFFICE.

WILFRED SHURTLEFF, OF MOLINE, ILLINOIS, ASSIGNOR TO THE HERMAN NELSON CORPORATION, OF MOLINE, ILLINOIS, A CORPORATION OF ILLINOIS.

AIR FILTER FOR HEATING AND VENTILATING UNITS.

Application filed January 19, 1923. Serial No. 613,581.

*To all whom it may concern:*

Be it known that I, WILFRED SHURTLEFF, a citizen of the United States, and a resident of Moline, in the county of Rock Island and State of Illinois, have invented certain new and useful Improvements in Air Filters for Heating and Ventilating Units.

This invention relates to improvements in air filters for heating and ventilating units, more particularly to a device to be used in conjunction with that type of heating apparatus in which the air supply is drawn directly from the outside atmosphere and thence discharged into the room to be heated or ventilated.

The object of the invention is to provide a practical and efficient method of filtering the incoming air as well as to provide a suitable filtering device so constructed as to remove the particles of dust and dirt from the air without materially reducing the efficiency of the apparatus and capable of being readily removed for the purpose of cleaning or otherwise renewing the filtering material.

In the drawings, a preferred embodiment of the invention is disclosed, and in combination with a specific type of heating and ventilating unit although it is to be understood that the device may be employed with other types of heating apparatus than herein shown.

Referring to the drawings:

Fig. 1 is a view in vertical section of a typical heating unit, with the filtering device installed in conjunction therewith.

Fig. 2 is an enlarged detailed view in horizontal section through the filtering device as taken on the line 2—2 of Fig. 1; and Fig. 3 is an enlarged view, in perspective, of the filtering device as it appears when removed and partially opened for renewal or renovating of the filtering material.

To illustrate the application and use of the air filter, a typical installation of the so-called unit type of heating apparatus is shown, the same consisting of an upright housing 1 adapted to be installed in the room to be heated and against an outer wall 2 thereof, immediately below a window 3.

Without going into detail as to the construction of the unit, the housing 1 is divided into an upper blower chamber and a lower heating chamber by means of a transverse partition wall 4, having an opening therein connecting the two compartments. In the blower chamber is a motor-driven blower 5 which delivers air under pressure into the heating chamber, the latter containing a radiator 6, through which the air passes as indicated by the arrows, and finally to be discharged through an outlet opening 7 near the top of the heating chamber, and in a general upward and outward direction into the room.

The source of the air supply to the housing 1, and particularly to the blower chamber thereof, is through a horizontal duct 8 connecting with the rear wall of the blower chamber and extending through the outer wall 2 of the building. A wire screen 9 preferably covers the outer end of the duct and an arrangement of louvers 10 is mounted at the inner end, the latter being adjustable to control the volume of air admitted to the blower chamber.

Referring, now, to the air filter, the same is preferably located in the duct 8 intermediate to the outer and inner ends thereof, provision being made for removably inserting the air filter through the top wall of the duct and for supporting it in an upright position, as will presently be pointed out.

The filter comprises a metal container or casing relatively shallow in depth or transverse dimension and of a length and width substantially equal to the cross-sectional area of the duct, although it is clearly shown in the Figure 1 its width or vertical dimension is considerably greater than the height of the duct, in order that it may be readily accessible, as well as to afford an increased filtering area. The casing, as clearly shown in Fig. 3, consists of imperforate bottom, top and end walls 11, 12, and 13, respectively, the top wall being slightly greater in longitudinal and transverse directions in order to provide extending margins or flanges. Secured to the top wall are handles 12ª—12ª, to be used for removing and inserting the casing. The front and back walls 14 and 15, respectively, are perforate in that they consist of metallic frames which support screens of wire mesh 16, of a relatively coarse texture, as, for instance, one-half inch wire mesh. The front and back walls 14 and 15 differ only in that one of them is hinged on its lower edge in any suitable manner, such as pintles 17—17, which are inserted through ears formed at the lower edges of the end walls 13—13. By hinging one of the side walls, such as the wall 15, access to the interior of the casing may be had, and in which a quantity of the filtering material 18 is retained, this being preferably a mass of steel wire or metallic shavings thoroughly saturated with viscous oil of any suitable character. While experiments have determined that this particular material is well suited for the purpose, other materials may equally well be substituted. In any event, the filtering material 18 is packed in the casing, so as to provide a layer of relatively porous substance capable of withholding particles of dust, but permitting the air to pass readily therethrough, without materially resisting its flow.

Owing to the particular installation herein disclosed, I have shown the filtering device as slightly curved and, in its position in the duct, its convex surface faces outwardly and its concave surface inwardly toward the intake end of the duct. I have also shown the inner or concaved end wall 15 as hinged.

As a means for inserting the filtering device into the duct 8 and for supporting the same, the upper wall of said duct is provided with an inwardly and upwardly inclined neck 18, which converges slightly from its base to a rectangular opening or slot, lying in a plane substantially 45 degrees to the vertical and immediately to the rear and above the top wall of the housing 1. Surrounding the opening or slot of the neck 18 is a bead 19 formed by bending or crimping the marginal portion of said neck.

Extending across the bottom of the duct 8 and immediately below the base of the neck 18 is a shallow receptacle 20 extending transversely of the duct, and adapted to receive the lower end of the casing when the same is in filtering position. This receptacle is designed to collect and retain any excess oil that may find its way to the bottom of the casing.

As is clearly shown in Fig. 1, the device, in operative position, stands upright and cross-wise of the duct 8, with its base portion resting in the receptacle 20, and its upper portion extending through and substantially filling the neck 18. The top wall 12 lies exterior to the neck 18, with its projecting edges lying flatwise against the marginal bead 19, thereby forming a seal or closure for the opening in the neck, to prevent the escape of air into the room.

The casing is readily removed by simply lifting it out by means of the handles, this being done periodically for the purpose of renovating or renewing the filtering material 18. When using a filtering material such as hereinbefore suggested, it may be readily renovated by soaking the mass in gasoline or a strong alkali solution such as lye, thus removing the oil, together with the dust and dirt. The mass thus cleaned is again saturated in oil and replaced in the casing and the same restored to its position in the duct 8.

While the installation of a filtering device has been shown in connection with the intake duct 8 thereof at the inlet end of the apparatus, it would be entirely feasible to locate it elsewhere, as for instance, in the lower portion of a heating chamber or any other suitable point intermediate to the inlet end of the apparatus, and the discharge opening into the room. The essential purpose to be accomplished being that of passing all of the air through the filtering device before it is discharged into the room. Hence, locating it in the intake duct, however, removes the dirt before the air enters the apparatus, thus preventing the accumulation of dirt within the housing.

Manifestly the construction of the device may be modified without departing from this invention, as well as its location with respect to the particular heating apparatus with which it is used. Therefore, I do not wish to be limited except in so far as the features of the invention are set forth in the appended claims.

I claim:

1. In a heating apparatus, the combination with a horizontal air duct, of an air filter adapted to be removably positioned crosswise of said duct and insertable through an opening in the top wall thereof, said casing being adapted to contain a mass of filtering material, and a receptacle extending transversely of the bottom of said duct and adapted to receive the lower portion of said casing.

2. The combination of an air duct, having a rectangular opening in one wall thereof, a relatively shallow casing adapted to be inserted through said opening, and positioned crosswise of said duct, said casing comprising opposite perforate side walls, and an imperforate end wall provided with extending margins adapted to engage the edges of said opening to seal the same, a mass of filtering material in said casing, and a receptacle extending along the bottom of said duct and adapted to receive the lower portion of said casing.

3. The combination with a horizontal air duct having an opening in the top wall thereof, of a removable casing adapted to contain a mass of filtering material and comprising opposite side walls of wire mesh, one of said side walls being hinged to permit access to the casing and an imperforate top wall having extending margins adapted to seal the opening in said duct when said casing is inserted, and a trough in the bottom of said duct to receive the lower edge of said casing.

In witness whereof, I hereunto subscribe my name this 9 day of January, A. D., 1923.

WILFRED SHURTLEFF.